Patented June 17, 1924.

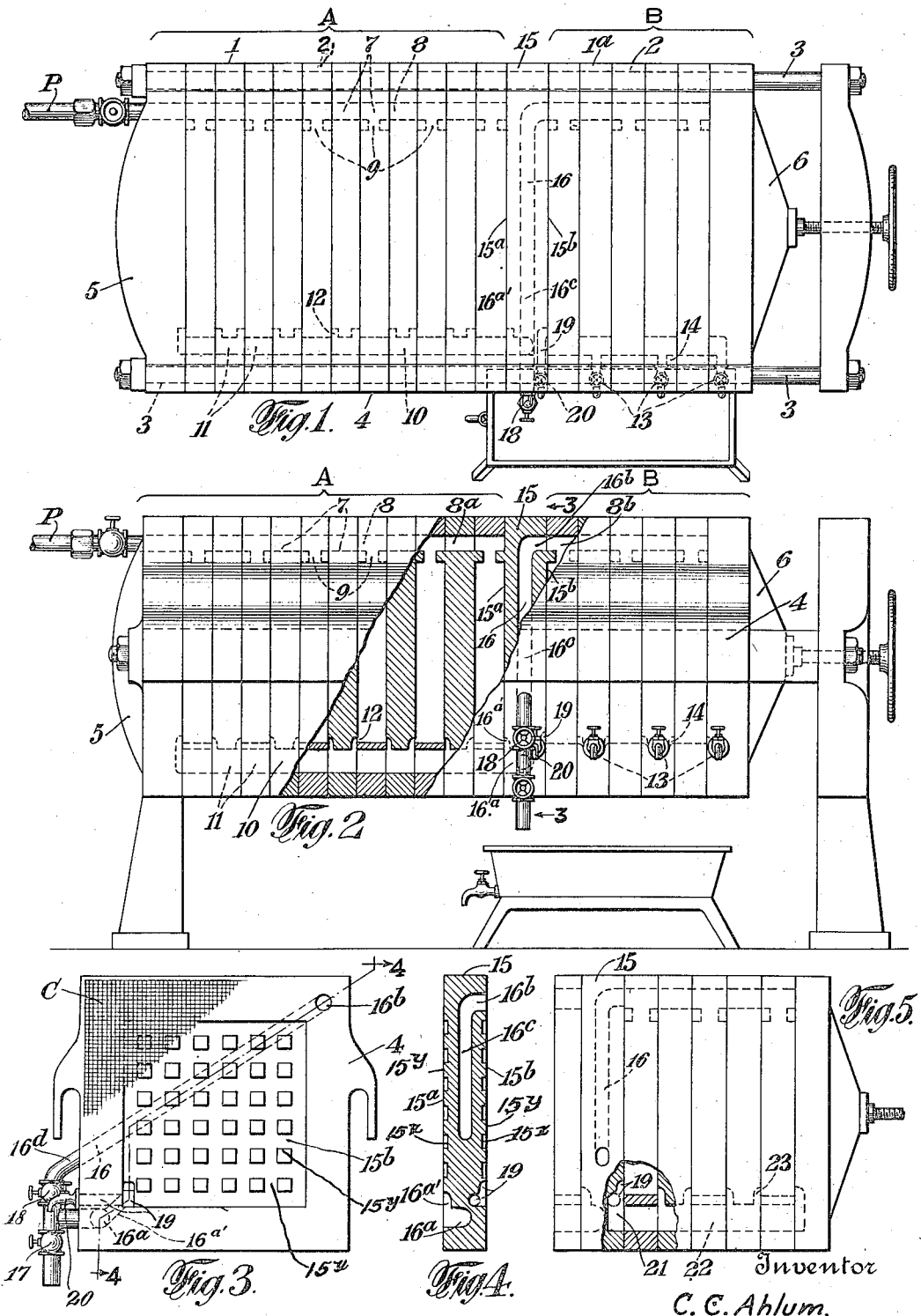

1,498,313

UNITED STATES PATENT OFFICE.

CHARLES C. AHLUM, OF CHESTER, PENNSYLVANIA, ASSIGNOR TO E. I. DU PONT DE NEMOURS & COMPANY, OF WILMINGTON, DELAWARE, A CORPORATION OF DELAWARE.

FILTER PRESS AND FILTER PLATE THEREFOR.

Application filed July 17, 1920. Serial No. 396,942.

*To all whom it may concern:*

Be it known that I, CHARLES C. AHLUM, a citizen of the United States, and a resident of Chester, in the county of Delaware and State of Pennsylvania, have invented a certain new and useful Filter Press and Filter Plate Therefor, of which the following is a specification.

This invention relates to a filter press, and to a filter plate for use therein and in similar presses.

There are many materials, especially those of a colloidal nature, which it is not possible to completely filter or clarify in a single passage through the usual filter press, when working at a normal and economical rate of filtration. Using a multiplicity of cloths between the frames and plates of the press only slightly improves clarification, while filtration is impeded to a very marked degree, making it an uneconomical, and in some cases, an impracticable procedure. This difficulty is usually overcome by filtering the liquid twice, first through one press to remove most of the solids, and then through a second press to secure clarification. This practice of filtering by two separate presses is, however, subject to various objections, such as complication of apparatus, and so forth. I have devised a press whereby double filtration can be conveniently and readily carried on in a single press, and have also devised a filter plate for use as a plate of said press.

One object of the invention is to provide a filter press having means intermediate the ends of its rank of filter units, e. g., its plates and frames, for transferring the filtrate from one portion of the rank to the inlet conduit of another portion of the rank, whereby the material to be filtered can be first filtered in the one portion of the rank, and the resulting filtrate then clarified in the other portion of rank, giving double filtration in a single press.

Another object is to provide a filter plate for insertion intermediate the ends of the rank of filter units of a press, and having means for transferring the filtrate from one portion of the rank to the inlet conduit of the other portion of the rank.

To these ends, and also to improve generally upon devices of the character indicated, my invention consists in the various matters hereinafter described and claimed.

Without restricting my invention thereto, I describe the same by reference to the embodiments thereof illustrated in the accompanying drawings. In these drawings:—

Figure 1 is a plan view of a filter press embodying my invention;

Figure 2 is an elevational view of the press illustrated in Figure 1, certain portions being broken out approximately on a plane extending diagonally from the front lower corner to the back upper corner of the rank of plates and frames, to show the interior construction, and detailed showing of the contours of the drainage faces of the plates being omitted for simplicity;

Figure 3 is a face view of the transferring filter plate, forming a feature of my invention and such as is embodied in the illustrated press, the plate being viewed looking in the direction of the arrows 3, 3 in Figure 2;

Figure 4 is an approximately diagonal section of the transferring filter plate, taken substantially on the line 4—4 of Figure 3 and looking in the direction of the arrows, and Figure 5 is a fragmental side elevation of a press having a somewhat modified transfer plate, the corner of the plate, and the immediately adjacent parts, being broken out, and the exterior piping of the plate being omitted, the better to show the construction.

Figures 1, 2 and 5 are somewhat diagrammatic and conventional in character.

Referring now to the drawings and, for the present, more particularly to Figures 1 to 4:—The illustrated press comprises a rank of filter units composed of filter plate units 1 and 1ª, and distance, or cake frame, units 2, carried on the side bars 3 by the supporting lugs 4. As will be understood by those skilled in the filter press art, the filter plates are provided on their faces with ribs, nubs, or equivalent contour to furnish both supports for the filter cloth at intervals over its surface, and channels or grooves for draining the face of the plate, similar to the face shown in Figure 3 where the plate has nubs 15ʸ and grooves 15ˣ; while the cake frames are but open frames without faces, and having provisions, at the passages 9 shown as at the corners of the frames in Figures 1 and 2, for admitting material to the frames. In practice filtering mediums, as filter cloths C (not shown, except in part in Figure 3, in order to avoid confusion), are inserted between each frame and the matching drainage-face of the adjacent plate. A head 5 and a follower 6, each in the character of a half-plate with its drainage face facing the adjacent frame, form the end units of the rank. A series of apertures or through passages, 7, one in the corner of each plate and frame—the top rear corner as shown in the drawing—form an inlet conduit 8, this conduit being directly connected with the interior of the frames by the passages 9. Preferably, the plates 1 are of the closed delivery type and the plates 1ª of the open delivery, or bibcock, type. An outlet conduit 10 is provided by apertures 11 in the lower front corners of the closed delivery plates 1 and the associated frames 2, and is connected with each drainage face of such plates by passages 12, the interiors of the frames being in communication with the conduit 10 only indirectly, i. e. by way of the passages 12 in the plates (and the filter cloths). The plates 1ª are provided with bibcocks 13 each connected with the drainage faces of the plates by the passages 14. The structure as thus far described will be understood by those skilled in the art without extended description, its details not involving the primary features of my invention. It is to be noted, however, that by the use of the closed delivery plates I provide for the collection of the various filtrates from the plates 1; the particular virtue thereof, in connection with my invention, will appear as this description proceeds.

According to the present invention, the press comprises, in lieu of one of the usual plates of such a press, a transfer member 15, constructed in accordance with the invention and located between two of the frames of, and intermediate the length of, the rank of plates and frames. The illustrated member 15 is in the character of a transfer plate, or double-faced transferring filter plate having drainage faces 15ª and 15ᵇ, that is, surfaces or faces of a character to permit ready passage of liquid through the filter cloth spanning the member and draining of such liquid from the member, a series of intersecting drainage grooves 15ˣ, giving free spaces between the cloth and the bottoms of the grooves, and a series of upstanding cloth-supporting nubs 15ʸ, being shown in the present instance. The member 15 is provided with a transfer passage 16 that communicates at one end, or port, 16ª with the outlet conduit 10, to receive therefrom the collected filtrates from the plates 1, and also communicates with the drainage face 15ᶜ. At its other end, or port, 16ᵇ, the passage 16 communicates with the conduit 8. The two ports 16ª and 16ᵇ face oppositely and, as illustrated, are out of alignment and substantially diagonally spaced on the plate, the port 16ᵇ opening on the margin surrounding the face 15ᵇ at the upper rear corner thereof. The member 15 has no aperture, such as an aperture 7, to serve as a continuing unit of the inlet passage 8; instead of having such an aperture, it divides the inlet conduit 8 into two distinct portions, 8ª and 8ᵇ, the one 8ª, serving only the section A of the press and the other, 8ᵇ, serving only the section B of the press.

With this arrangement, the member 15, itself serving as a filter plate for both the section A and the section B, transfers the filtrate, collected from the section A and derived from the solution to be filtered which is fed in through the entrance pipe P, to the portion 8ᵇ of the inlet conduit. From the portion 8ᵇ the filtrate from the section A passes to the frames of the section B and is clarified. Thus the press, by virtue of the present invention, performs double filtration, all complication of apparatus, and of manipulation, incident to the use of two distinct presses being overcome and eliminated.

In the illustrated transfer plate 15 the transfer passage 16, for convenience, lies in part in the body of the plate, as indicated at 16ᶜ and is in part composed of an exterior pipe 16ᵈ. This portion 16ᵈ since it is exterior of the plate provides for the convenient installation of the valves 17 and 18. With these valves, by closing of the valve 17 and opening of the valve 18 the flow of filtrate from the section A can be directed to the section B, or, if desired, by closing of the valve 18 and opening the valve 17, the said filtrate can be withdrawn without passing it through the section B. An enlargement 16ᵃ' of the port 16ª of the transfer passage 16 provides for the flow of filtrate from the face 15ª to the passage 16, or, in effect, to the conduit 10. A passage 19, provided at its outlet with a bibcock 20 and connected with the face 15ᵇ, provides for the flow of clarified filtrate from the face 15ᵇ.

Although the illustrated press comprises plates and frames, rather than recessed plates, and has side, rather than center, feed provisions, it will be understood that the invention is applicable to recessed plates and to center delivery constructions. Also, if preferred, the section B of the press may have closed, rather than open, delivery plates. For convenient use with closed delivery plates in the section B, I desirably (see Figure 5) provide the plate 15 with a passage 21 connecting the passage 19 with the margin of the face 15ᵇ at its lower forward corner and in position to register with the end of the conduit 22 which, by way of the passages 23, collects the clarified filtrate from the closed delivery plates. As will be understood, when a plate 15, having the passage 21, is used with open delivery plates, the passage's open end is closed by the margin of the abutting frame which, of course, and as in Figures 1 and 2, has no delivery-conduit section in it. Thus a plate with both the passage 19 and the passage 21 is adapted to serve with either open or closed delivery units in the section B.

In operation, filter cloths of any particular type desired are placed throughout the length of the press to lie between the plates and cake frames and overlie the various drainage surfaces of the plates; the material to be filtered is fed in under suitable head through the pipe P, section 8ª of the conduit 8, and passages 9, and the filtrate drains into the conduit 10 through the passages 12; all as will be understood by those skilled in the art. In accordance with the invention, the filtrate collecting in the conduit 10 is passed through the passage 16 of the transferring member (the valve 17 being closed and the valve 18 open) and into the section 8ᵇ of the conduit 8, whence it is delivered to the cake frames between the plates 1ª and is filtered through the cloths. The clarified filtrate is drawn off through the bibcock 20 and the bibcocks 13 (Figs. 1 and 2) or is collected in the conduit 22 (Fig. 5) and discharged through the passage 21—19 and the bibcock 20, depending on whether open delivery or closed delivery plates are used in the section B of the press.

I claim:

1. In a filter press, in combination, a rank of plates and frames having an inlet provision, and an outlet provision for filtrate, and a transferring filter plate inserted in said rank between two of said frames, in lieu of a usual plate of such a rank, and dividing the rank into two sections, such transferring plate being provided with means connecting the filtrate outlet provision of one section with the inlet provision of the other section whereby filtrate from the said one section may be transferred to, and clarified in, the other said section.

2. In a filter press, in combination, a rank of plates and frames having an inlet provision, and an outlet provision for filtrate, and a transferring filter plate inserted in said rank between two of said frames, in lieu of a usual plate of such a rank, and dividing the rank into two sections, with one of said sections comprising a plurality of filter units, said inlet and outlet provisions providing for supply of liquid to such plurality of units and the collection of the individual filtrates therefrom, such transferring plate being provided with means connecting the filtrate outlet provision of the said one section with the inlet provision of the other section whereby filtrate from the said one section may be transferred to, and clarified in, the other said section.

3. In a filter press, in combination, a rank of plates and frames adapted for the insertion of filtering mediums between the plates and frames, having an inlet provision, and an outlet provision for filtrate, and a transferring filter plate inserted in said rank between two of said frames, in lieu of a usual plate of such a rank, adapted for cooperation with the filtering medium to be received between such transferring plate and the immediately adjacent frame, and dividing the rank into two sections, such transferring plate being provided with means connecting the filtrate outlet provision of one section with the inlet provision of the other section whereby filtrate from the said one section may be transferred to, and clarified in, the other said section.

4. In a filter press, in combination, a rank of plates and frames having an inlet provision, and an outlet provision for filtrate, and a transferring device inserted in said rank between two of said frames, in lieu of a usual plate of such a rank, and dividing the rank into sections with one section comprising a plurality of cake frames, said inlet provision directly communicating with the interior of each of such frames, such transferring device being provided with means connecting the filtrate outlet provision of the said one section with the inlet provision of the other section whereby filtrate from the said one section may be transferred to, and clarified in, the other said section.

5. In a filter press, in combination, a rank of plates and frames having an inlet provision, and an outlet provision for filtrate, and a transferring device inserted in said rank between two of said frames, in lieu of a usual plate of such a rank, and dividing the rank into sections with one section comprising a plurality of cake frames, said inlet provision directly communicating with the interior of each of such frames, and said outlet provision communicating only indirectly with the interior of each of such frames, such transferring device being provided with means connecting the filtrate outlet provision of the said one section with the inlet provision of the other section whereby filtrate from the said one section may be transferred to, and clarified in, the other said section.

6. In a filter press, in combination, a rank of plates and frames adapted for the insertion of filtering mediums between the plates and frames, having an inlet provision, and an outlet provision for filtrate, and a transferring filter plate inserted in said rank between two of said frames, in lieu of a usual plate of such a rank, adapted for cooperation with the filtering medium to be received between such transferring plate and the immediately adjacent frame and dividing the rank into two sections with one section comprising a plurality of cake frames, said inlet provision directly communicating with the interior of each of such frames and said outlet provision communicating only indirectly and by way of said filtering mediums with the interior of each of such frames, such transferring plate being provided with means connecting the filtrate outlet provision of the said one section with the inlet provision of the other section whereby filtrate from the said one section may be transferred to, and clarified in, the other said section.

7. In a filter press, in combination, a series of filter units presenting two sections and having means presenting an inlet conduit for said series and also having means presenting an outlet conduit for a section of said series, and a transferring member located between two of said units and between the adjacent ends of said sections, said transferring member having a portion thereof located and positioned to interrupt said inlet conduit and thereby divide the same into separate lengths, and said transferring member also having a transfer passage located relatively to the body of said member, and to the units between which said member is inserted, in position to connect the outlet conduit, of the section having the same, with the portion of said inlet conduit lying at the other side of said member from such section, whereby filtrate from such section may be transferred from such section to the portion of said inlet conduit feeding the other section.

8. In a filter press, in combination, a series of plates and frames adapted for the insertion of filtering mediums between the plates and frames, presenting two sections and having means presenting an inlet conduit for said series and also having means presenting an outlet conduit for a section of said series, and a transferring filter plate located between two of said frames and between the adjacent ends of said sections, said transferring plate being contoured on each side to give a drainage surface adapting said plate for cooperation with the filtering medium to be received between such transferring plate and the immediately adjacent frame, said plate having a portion thereof located and positioned to interrupt said inlet conduit and thereby divide the same into separate lengths, and said transferring plate also having a transfer passage located relatively to the body of said plate, and to the frames between which said plate is inserted, in position to connect the outlet conduit, of the section having the same, with the portion of said inlet conduit lying at the other side of said plate from such section, whereby filtrate from such section may be transferred from such section to the portion of said inlet conduit feeding the other section.

9. As an article of manufacture, a transfer member for use in a filter press, contoured for insertion between filter units of a press and for cooperation with each of the units between which it may be inserted, and provided with a port opening upon and primarily communicating with one side only of the member, a port opening upon and primarily communicating with the other side only of the member, and a transfer passage connecting said two ports.

10. As an article of manufacture, a transfer member for use in a filter press, contoured for insertion between filter units of a press and for cooperation with each of the units between which it may be inserted, and provided with a port opening upon and primarily communicating with one side only of the member, a port opening upon and primarily communicating with the other side only of the member, and a transfer passage connecting said two ports such transfer passage being provided in part by piping lying exterior of the body of the member.

11. As an article of manufacture, a transfer plate for use in a filter press, contoured to present a drainage surface and for insertion between filter units of a press and for co-operation with each of the units between which it may be inserted, provided with a pair of separate and distinct primarily non-communicating ports one opening upon one side of the member and the other upon the other, provided with a transfer passage connecting said two ports, and also provided with a passage for conveying liquid from said drainage surface to the exterior of said plate.

12. As an article of manufacture, a transferring filter plate, contoured on each side to give a drainage surface, provided with a port primarily communicating with the drainage surface of only one side, provided with a port primarily communicating with the face of only the other side, and provided with a transfer passage connecting said two ports.

13. As an article of manufacture, a transferring filter plate, contoured on each side to give a drainage surface, provided with a port primarily communicating with the drainage surface of only one side, provided with a port primarily communicating with the face of only the other side, and provided with a transfer passage connecting said two ports such transfer passage being provided in part by piping lying exterior of the body of the member.

14. As an article of manufacture, a transferring filter plate having each face presenting a recess for receiving filtrate therein to provide for draining of the filtrate across said face, said plate being provided with a port primarily communicating with one face only, provided with a port primarily communicating with the other face only, and provided with a transfer passage connecting said two ports.

15. As an article of manufacture, a transferring filter plate having each face presenting a recess for receiving filtrate therein to provide for draining of the filtrate across said face and also presenting an upstanding portion for the support of a filtering medium, said plate being provided with a port primarily communicating with one face only, provided with a port primarily communicating with the other face only, and provided with a transfer passage connecting said two ports.

16. As an article of manufacture, a transferring filter plate, contoured on one side to give a drainage surface and on the other side to give a drainage surface and a surrounding margin therefor, provided with a port communicating with the drainage surface of the said one side, provided with a port communicating with the margin of the said other side, and in non-communication with the drainage surface of such side, and provided with a transfer passage connecting said two ports.

17. As an article of manufacture, a substantially rectangular transferring filter plate, contoured on one side to give a drainage surface and on the other side to give a drainage surface and a surrounding margin therefor, provided with a port communicating with the drainage surface of the said one side and located substantially at one corner thereof, provided with a port communicating with the margin of the said other side and located substantially at a different corner of said plate than is said first named port, and provided with a transfer passage connecting said two ports.

18. As an article of manufacture, a substantially rectangular transferring filter plate, contoured on one side to give a drainage surface and on the other side to give a drainage surface and a surrounding margin therefor, provided with a port communicating with the drainage surface of the said one side and located substantially at one corner thereof, provided with a port communicating with the margin of the said other side, and located substantially at a corner of said plate diagonally opposite said first named corner, and provided with a transfer passage connecting said two ports.

In testimony whereof I affix my signature.

CHARLES C. AHLUM.